United States Patent
Lu et al.

(10) Patent No.: US 9,277,227 B2
(45) Date of Patent: Mar. 1, 2016

(54) METHODS AND APPARATUS FOR DC INTRA PREDICTION MODE FOR VIDEO ENCODING AND DECODING

(75) Inventors: Xiaoan Lu, Princeton, NJ (US); Peng Yin, Ithaca, NY (US); Yunfei Zheng, San Diego, CA (US); Joel Sole, La Jolla, CA (US); Qian Xu, Folsom, CA (US)

(73) Assignee: THOMAS LICENSING, Issy les Moulineaux (FR)

( * ) Notice: Subject to any disclaimer, the term of this patent is extended or adjusted under 35 U.S.C. 154(b) by 947 days.

(21) Appl. No.: 13/503,210

(22) PCT Filed: Oct. 6, 2010

(86) PCT No.: PCT/US2010/002690
§ 371 (c)(1),
(2), (4) Date: Apr. 20, 2012

(87) PCT Pub. No.: WO2011/049605
PCT Pub. Date: Apr. 28, 2011

(65) Prior Publication Data
US 2012/0213279 A1    Aug. 23, 2012

Related U.S. Application Data

(60) Provisional application No. 61/254,095, filed on Oct. 22, 2009.

(51) Int. Cl.
*H04N 7/32* (2006.01)
*H04N 19/11* (2014.01)
*H04N 19/176* (2014.01)
*H04N 19/147* (2014.01)
(Continued)

(52) U.S. Cl.
CPC .............. *H04N 19/11* (2014.11); *H04N 19/14* (2014.11); *H04N 19/147* (2014.11); *H04N 19/176* (2014.11); *H04N 19/46* (2014.11); *H04N 19/593* (2014.11); *H04N 19/61* (2014.11)

(58) Field of Classification Search
None
See application file for complete search history.

(56) References Cited

U.S. PATENT DOCUMENTS

2003/0235339 A1   12/2003   Shin
2004/0062310 A1   4/2004   Xue et al.
(Continued)

FOREIGN PATENT DOCUMENTS

CN   1497985   5/2004
JP   63311870   12/1988
(Continued)

OTHER PUBLICATIONS

Wiegand et al. ("Overview of the H.264/AVC Video Coding Standard" IEEE Tran. on circuits and system for video technology, Jul. 2003).*

(Continued)

*Primary Examiner* — Kate Luo
(74) *Attorney, Agent, or Firm* — Robert D. Shedd; Ronald J. Kolezynski

(57) ABSTRACT

Methods and apparatus are provided for DC intra prediction mode for video encoding and decoding. An apparatus includes a video encoder for encoding image data for at least a portion of an input picture by deriving a direct current prediction value from a pre-determined constant and using the derived direct current prediction value for a direct current intra prediction mode. The portion is encoded using the direct current intra prediction mode.

18 Claims, 19 Drawing Sheets

(51) Int. Cl.
| | |
|---|---|
| H04N 19/46 | (2014.01) |
| H04N 19/61 | (2014.01) |
| H04N 19/593 | (2014.01) |
| H04N 19/14 | (2014.01) |

(56) References Cited

U.S. PATENT DOCUMENTS

| | | | | |
|---|---|---|---|---|
| 2004/0062445 | A1 | 4/2004 | Kim et al. | |
| 2008/0025396 | A1* | 1/2008 | Tasaka et al. | 375/240.12 |
| 2008/0037883 | A1 | 2/2008 | Tsutsumi et al. | |
| 2009/0196350 | A1* | 8/2009 | Xiong | 375/240.12 |
| 2010/0208803 | A1 | 8/2010 | Matsuo et al. | |

FOREIGN PATENT DOCUMENTS

| | | |
|---|---|---|
| JP | 03220887 | 9/1991 |
| JP | 200432698 | 1/2004 |
| JP | 2004023370 | 1/2004 |
| JP | 2007173886 | 7/2007 |
| JP | 200917502 | 1/2009 |
| WO | WO2009051091 | 4/2009 |
| WO | WO2009051419 | 4/2009 |

OTHER PUBLICATIONS

Pan, F. et al.: "Fast Mode Decision Algorithm for Intraprediction in H.264/AVC Video Coding", IEEE Transactions on Circuits and Systems for Video Technology, IEEE Service Center, Piscataway, NJ, US, vol. 15, No. 7, Jul. 1, 2005, pp. 813-822.

Nan, Z. et al.: "Spatial Prediction Based Intra-Coding", 2004 IEEE International Conference on Multimedia and Expo (ICME): Jun. 27-30, 2004, Taipei, Taiwan, Piscataway, NJ, IEEE Operations Center, US, vol. 1, Jun. 27, 2004, pp. 97-100.

Puri, A. et al.: "Video Coding Using the H.264/MPEG-4 AVC Compression Standard", Signal Processing: Image Communication 19 (2004), Elsevier Science Publishers, Amsterdam, NL, vol. 19, No. 9, Oct. 1, 2004, pp. 793-849.

He, X. et al.: "A Fast Intra-frame Prediction Algorithm Based on the Characteristic of Macro-block and 2D-histogram for H.264/AVC Standard", Intelligent Information Hiding and Multimedia Signal Processing, 2007, IIHMSP 2007. Third International Conference on, IEEE, Piscataway, NJ, USA, Nov. 26, 2007, pp. 182-185.

Tan, T. K. et al.: "Intra Prediction by Template Matching", ICIP 2006, Sep. 2006 IEEE, pp. 1693-1696.

ITU-T, H.264 (Mar. 2005), Telecommunication Standardization Sector of ITU, Series H: Audiovisual and Multimedia Systems, Infrastructure of audiovisual services—Coding of moving video, "Advanced Video Coding for Generic Audiovisual Services", ITU-T Recommendation H.264, 343 pages.

Yu, S-L. et al: "New Infra Prediction Using Intra-Macroblock Motion Compensation", Joint Video Team (JVT) of ISO/IEC MPEG & ITU-T VCEG (ISO/IEC JTC1/SC29/WG11 and ITU-T SG16 Q.6), 3rd Meeting: Fairfax, Virginia, USA, May 6-10, 2002, JVT-C151, 10 pages.

Balle, J. et al.: "Extended Texture Prediction for H.264 Intra Coding", ITU-Telecommunications Standardization Sector, Study Group 16, Question 6, Video Coding Experts Group (VCEG), 31st Meeting: Marrakech, MA, Jan. 15-16, 2007, Document: VCEG-AE11, 7 pages.

* cited by examiner 300
311

| M | A | B | C | D | E | F | G | H |
|---|---|---|---|---|---|---|---|---|
| I | → | | | | | | | |
| J | → | | | | | | | |
| K | → | | | | | | | |
| L | → | | | | | | | |

| M | A | B | C | D | E | F | G | H |
|---|---|---|---|---|---|---|---|---|
| I | | | | | | | | |
| J | Average of A-L | | | | | | | |
| K | | | | | | | | |
| L | | | | | | | | |

*FIG. 3D*

METHODS AND APPARATUS FOR DC INTRA PREDICTION MODE FOR VIDEO ENCODING AND DECODING

CROSS-REFERENCE TO RELATED APPLICATIONS

This application claims the benefit, under 35 U.S.C. §365 of International Application PCT/US2010/002690 and filed Oct. 6, 2010, which was published in accordance with PCT Article 21(2) on Apr. 28, 2011, in English, and which claims the benefit of U.S. Provisional Patent Application No. 61/254,095, filed on Oct. 22, 2009, in English, which are incorporated by reference in their respective entireties.

TECHNICAL FIELD

The present principles relate generally to video encoding and decoding and, more particularly, to methods and apparatus for direct current (DC) intra prediction mode for video encoding and decoding.

BACKGROUND

Predictive coding is an important technique in video coding. It is motivated by the fact that adjacent pixels in video signals often have similar values, thus it is more efficient to encode the difference between the pixels. In predictive coding, a sample is not encoded directly. Rather, an input sample is first predicted from a few previously reconstructed samples. Then the prediction error (residue) is quantized and entropy coded. The reconstructed value at the decoder is the predicted value plus the quantized residue. To guarantee the encoder and decoder use exactly the same prediction value, the encoder must use the same process as the decoder to reproduce reconstructed samples. This is called closed-loop prediction.

The International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard") is a video coding standard which employs spatial directional prediction for intra coding. When using intra prediction, pixels in a current block are predicted from its causal neighboring blocks. In addition to applying prediction in the spatial domain, the encoder can predict a block from previous frames through motion estimation and compensation. Such temporal prediction is very effective when the underlying content is stationary.

In the MPEG-4 AVC Standard, spatial intra prediction is formed using surrounding available samples, which are previously reconstructed samples available at both the encoder and decoder within the same slice. When the picture is encoded at a low bit rate, the reconstructed samples are distorted from the original samples due to large quantization errors. Since the previously reconstructed samples are used for intra prediction in the current block, the prediction errors become larger as the bitrate gets lower and the predictive coding is less efficient.

Spatial directional prediction for intra coding performed in accordance with the MPEG-4 AVC Standard provides a more flexible prediction framework, thus the coding efficiency is better than when compared to previous standards in which intra prediction was performed in the transform domain. As previously described, in the MPEG-4 AVC Standard, a spatial intra prediction is formed using surrounding available samples, which are previously reconstructed samples available at both the encoder and decoder within the same slice. For luma samples, intra prediction can be done on a 4×4 block basis (denoted as Intra_4×4), an 8×8 block basis (denoted as Intra_8×8) and on a 16×16 macroblock basis (denoted as Intra_16×16). Turning to FIG. 1, MPEG-4 AVC Standard directional intra prediction with respect to a 4×4 block basis (Intra_4×4) is indicated generally by the reference numeral 100. Prediction directions are generally indicated by the reference numeral 110, image blocks are generally indicated by the reference numeral 120, and a current block is indicated by the reference numeral 130. In addition to luma prediction, a separate chroma prediction is performed. There are a total of nine prediction modes for Intra_4×4 and Intra_8×8, four modes for Intra_16×16 and four modes for the chroma component. The encoder typically selects the prediction mode that minimizes the difference between the prediction and original block to be coded. A further intra coding mode, I_PCM, allows the encoder to simply bypass the prediction and transform coding processes. It allows the encoder to precisely represent the values of the samples and place an absolute limit on the number of bits that may be contained in a coded macroblock without constraining decoded image quality.

Turning to FIG. 2, labeling of prediction samples for the Intra_4×4 mode of the MPEG-4 AVC Standard is indicated generally by the reference numeral 200. FIG. 2 shows the samples (in capital letters A-M) above and to the left of the current blocks which have been previously coded and reconstructed and are therefore available at the encoder and decoder to form the prediction.

Turning to FIGS. 3B-J, Intra_4×4 luma prediction modes of the MPEG-4 AVC Standard are indicated generally by the reference numeral 300. The samples a, b, c, . . . , p of the prediction block are calculated based on the samples A-M using the Intra_4×4 luma prediction modes 300. The arrows in FIGS. 3B-J indicate the direction of prediction for each of the Intra_4×4 modes 300. The Intra_4×4 luma prediction modes 300 include modes 0-8, with mode 0 (FIG. 3B, indicated by reference numeral 310) corresponding to a vertical prediction mode, mode 1 (FIG. 3C, indicated by reference numeral 311) corresponding to a horizontal prediction mode, mode 2 (FIG. 3D, indicated by reference numeral 312) corresponding to a DC mode, mode 3 (FIG. 3E, indicated by reference numeral 313) corresponding to a diagonal down-left mode, mode 4 (FIG. 3F, indicated by reference numeral 314) corresponding to a diagonal down-right mode, mode 5 (FIG. 3G, indicated by reference numeral 315) corresponding to a vertical-right mode, mode 6 (FIG. 3H, indicated by reference numeral 316) corresponding to a horizontal-down mode, mode 7 (FIG. 3I, indicated by reference numeral 317) corresponding to a vertical-left mode, and mode 8 (FIG. 3J, indicated by reference numeral 318) corresponding to a horizontal-up mode. FIG. 3A shows the general prediction directions 330 corresponding to each of the Intra_4×4 modes 300.

In modes 3-8, the predicted samples are formed from a weighted average of the prediction samples A-M. Intra_8×8 uses basically the same concepts as the 4×4 predictions, but with a block size 8×8 and with low-pass filtering of the predictors to improve prediction performance.

Turning to FIGS. 4A-D, four Intra_16×16 modes corresponding to the MPEG-4 AVC Standard are indicated generally by the reference numeral 400. The four Intra_16×16 modes 400 includes modes 0-3, with mode 0 (FIG. 4A, indicated by reference numeral 411) corresponding to a vertical prediction mode, mode 1 (FIG. 4B, indicated by reference numeral 412) corresponding to a horizontal prediction mode, mode 2 (FIG. 4C, indicated by reference numeral 413) corresponding to a DC prediction mode, and mode 3 (FIG. 4D, indicated by reference numeral 414) corresponding to a plane prediction mode. Each 8×8 chroma component of an intra coded macroblock is predicted from previously encoded chroma samples above and/or to the left and both chroma components use the same prediction mode. The four prediction modes are very similar to the Intra_16×16, except that the numbering of the modes is different. The modes are DC (mode 0), horizontal (mode 1), vertical (mode 2) and plane (mode 3).

During the development of the ITU-T H.26L Standard, displaced intra prediction was proposed. The proposal re-uses the concept of variable block size inter-prediction as specified in the MPEG-4 AVC Standard for intra prediction.

Turning to FIG. 5A, an example of displaced intra prediction is indicated generally by the reference numeral 550. The displaced intra prediction 550 involves an intra coded region 552, a current block 554, and a candidate block 556. In general, previously encoded intra regions (e.g., intra coded region 552) of a slice can be referenced by displacement vectors (e.g., displacement vector 556) for prediction of the current intra block (e.g., current block 554). The displaced intra prediction 550 is implemented on a macroblock basis. The displacement vectors are encoded differentially using a prediction by the median of the neighboring blocks, in analogy to the inter motion vectors in the MPEG-4 AVC Standard.

Template matching prediction (TMP) is a concept of texture synthesis to deal with the generation of a continuous texture that resembles a given sample. Intra prediction using template matching in the context of the MPEG-4 AVC Standard has been proposed. In the proposal, the scheme is integrated as an additional mode for Intra_4×4 or Intra_8×8 prediction in the MPEG-4 AVC Standard. With template matching prediction, self-similarities of image regions are exploited for prediction. Previously encoded intra regions of a slice can be reused for prediction. The TMP algorithm recursively determines the value of current pixels under prediction by selecting at least one patch (of one or more pixels) of decoded data. Patches are selected according to a matching rule, where patch neighboring pixels are compared to current block neighboring pixels, and patches having the most similar neighboring pixels are selected. Turning to FIG. 5B, an example of template matching intra prediction is indicated generally by the reference numeral 570. The template matching intra prediction 570 involves a candidate neighborhood 572, a candidate patch 574, a template 576, and a target 578. Since the search region and the neighborhood (e.g., candidate neighborhood 572) of the current pixels (e.g., target 578) are known at the encoder and the decoder side, no additional side information has to be transmitted, and identical prediction is achieved on both sides.

Both DIP and TMP have improved the coding efficiency, at the cost of high computational complexity. Similar to other MPEG-4 AVC Standard spatial intra prediction modes, the prediction in DIP and TMP is formed using surrounding available samples. When the picture is encoded at a low bit rate, the reconstructed samples are distorted from the original samples due to large quantization errors, the prediction errors become larger, and the predictive coding is less efficient.

SUMMARY

These and other drawbacks and disadvantages of the prior art are addressed by the present principles, which are directed to methods and apparatus for DC intra prediction mode for video encoding and decoding.

According to an aspect of the present principles, there is provided an apparatus. The apparatus includes a video encoder for encoding image data for at least a portion of an input picture by deriving a direct current prediction value from a pre-determined constant and using the derived direct current prediction value for a direct current intra prediction mode. The portion is encoded using the direct current intra prediction mode.

According to another aspect of the present principles, there is provided a method in a video encoder. The method includes encoding image data for at least a portion of an input picture by deriving a direct current prediction value from a pre-determined constant and using the derived direct current prediction value for a direct current intra prediction mode. The portion is encoded using the direct current intra prediction mode.

According to yet another aspect of the present principles, there is provided an apparatus. The apparatus includes a video decoder for decoding image data for at least a portion of a picture by parsing a bitstream to obtain a direct current prediction value there from and using the parsed direct current prediction value for a direct current intra prediction mode. The portion is decoded using the direct current intra prediction mode.

According to still another aspect of the present principles, there is provided a method in a video decoder. The method includes decoding image data for at least a portion of a picture by parsing a bitstream to obtain a direct current prediction value there from and using the parsed direct current prediction value for a direct current intra prediction mode, the portion being decoded using the direct current intra prediction mode.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 3A-J are diagrams respectively showing Intra_4×4 luma prediction modes of the MPEG-4 AVC Standard;

DETAILED DESCRIPTION

Figures 1, 2:
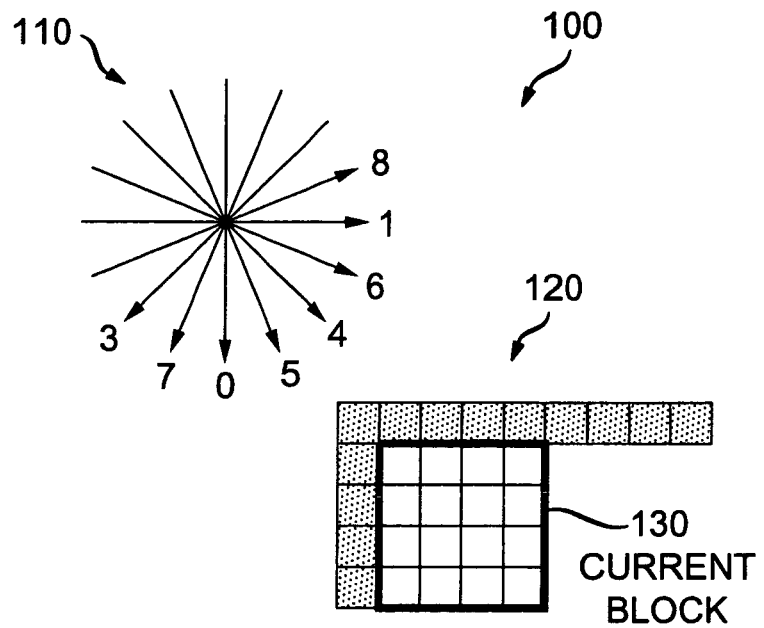
FIG. 1 is a diagram showing MPEG-4 AVC Standard directional intra prediction with respect to a 4×4 block basis (Intra_4×4)
FIG. 2 is a diagram showing labeling of prediction samples for the Intra_4×4 mode of the MPEG-4 AVC Standard.
Figure 3A:
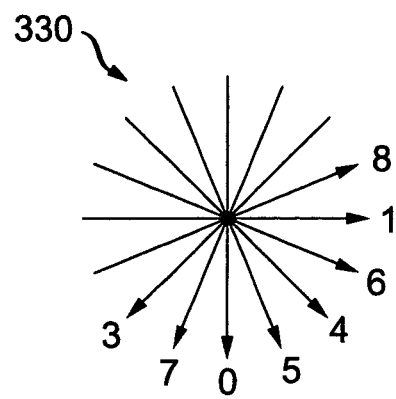
Figure 3B:
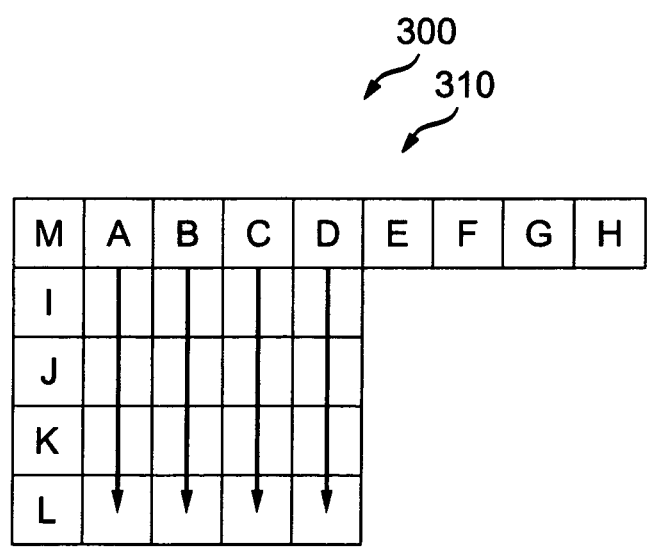
Figure 3E:
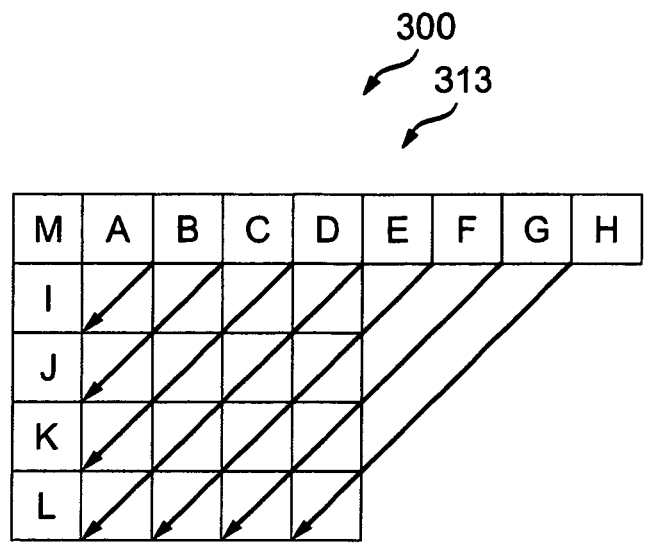
Figure 3F:
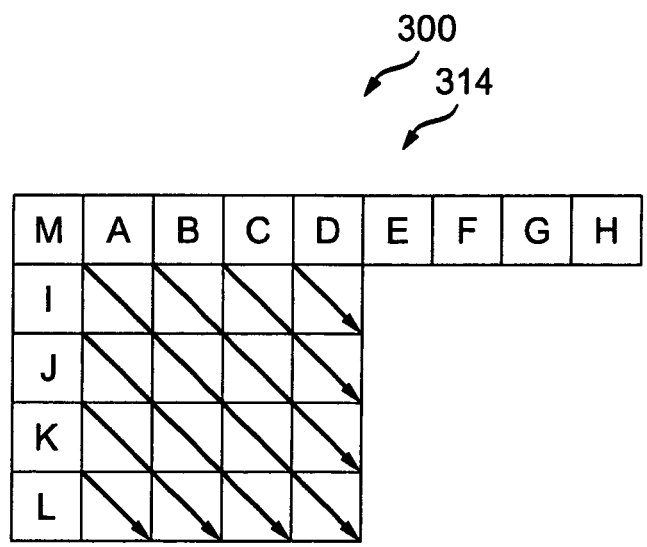
Figure 3G:
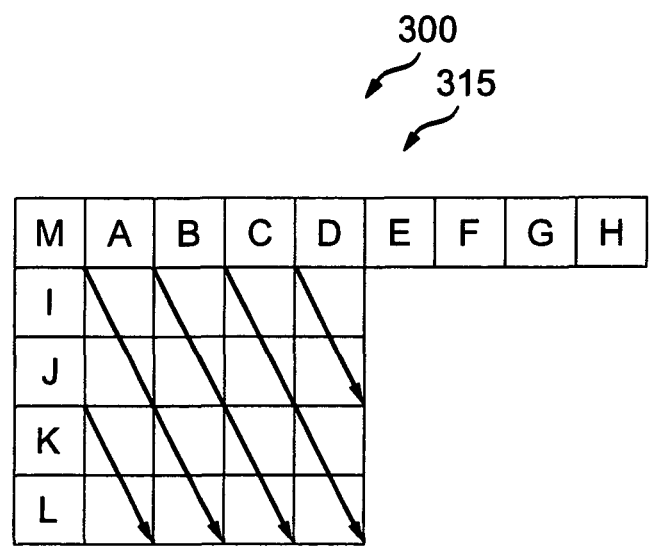
Figure 3H:
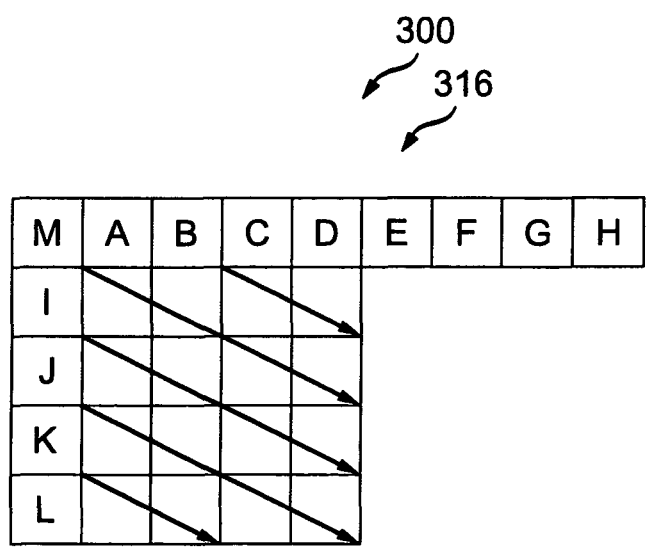
Figure 3I:
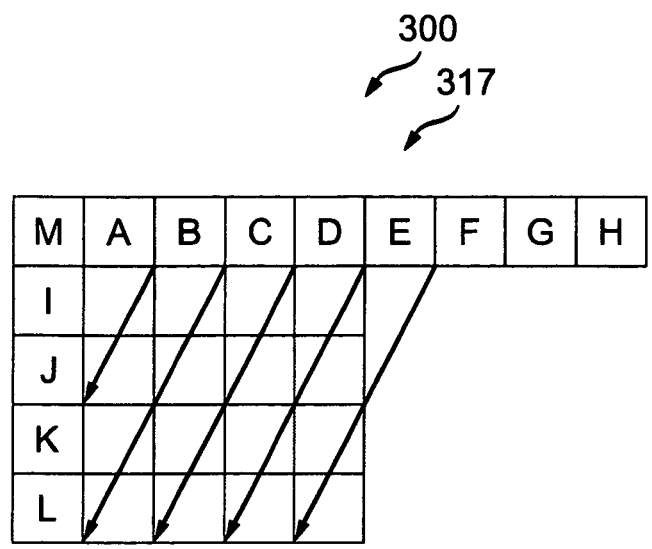
Figure 3J:
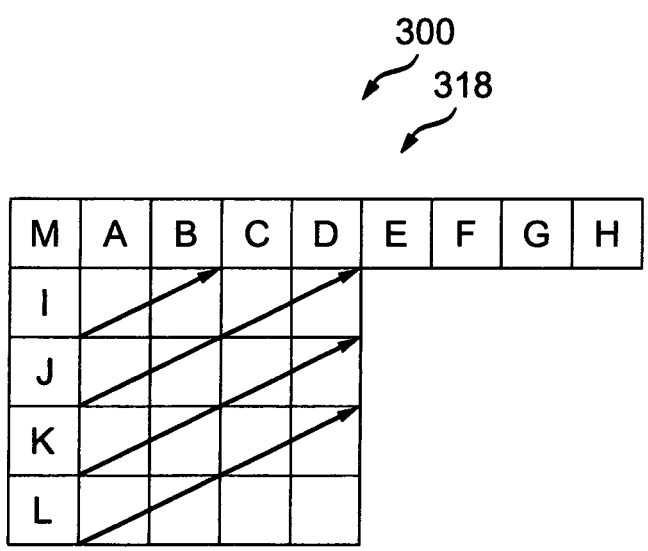
Figure 4A:
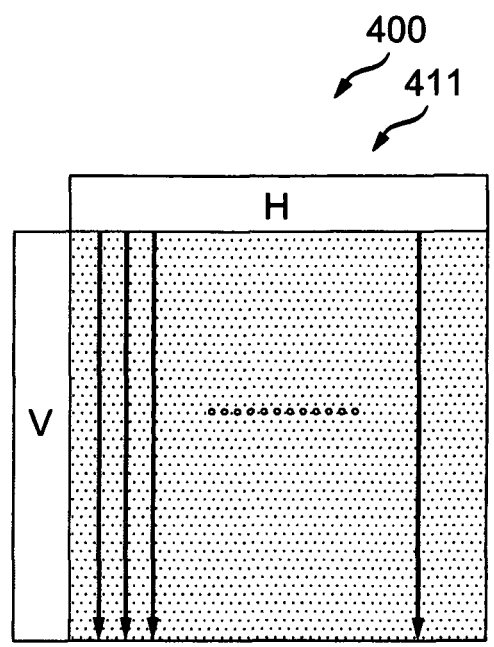
FIGS. 4A-D are diagrams respectively showing four Intra_16×16 modes corresponding to the MPEG-4 AVC Standard.
Figure 4B:
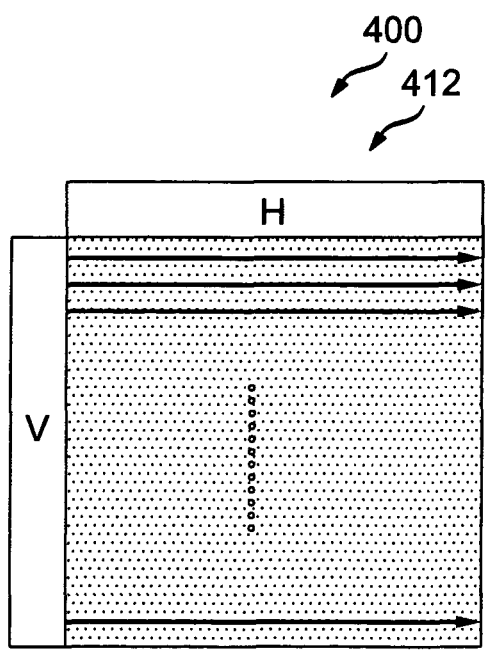
Figure 4C:
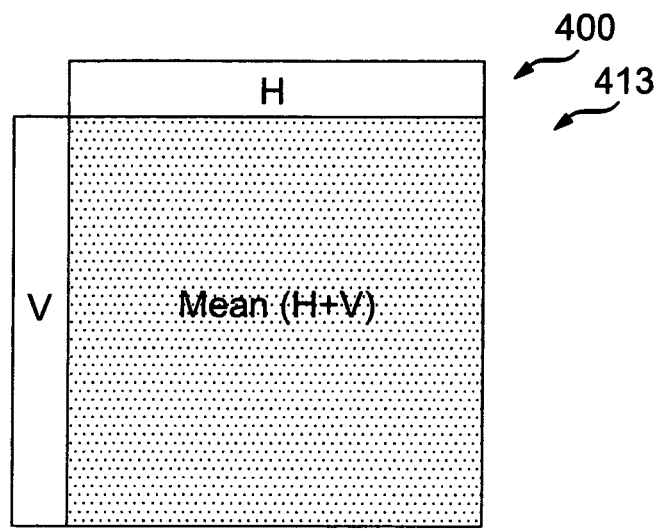
Figure 4D:
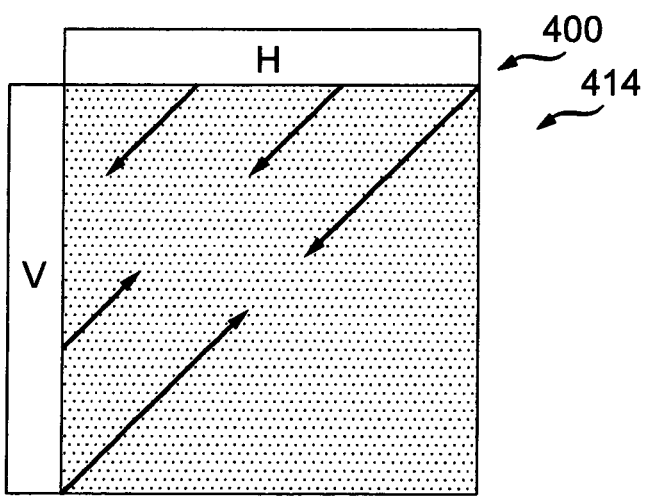
Figure 5A:
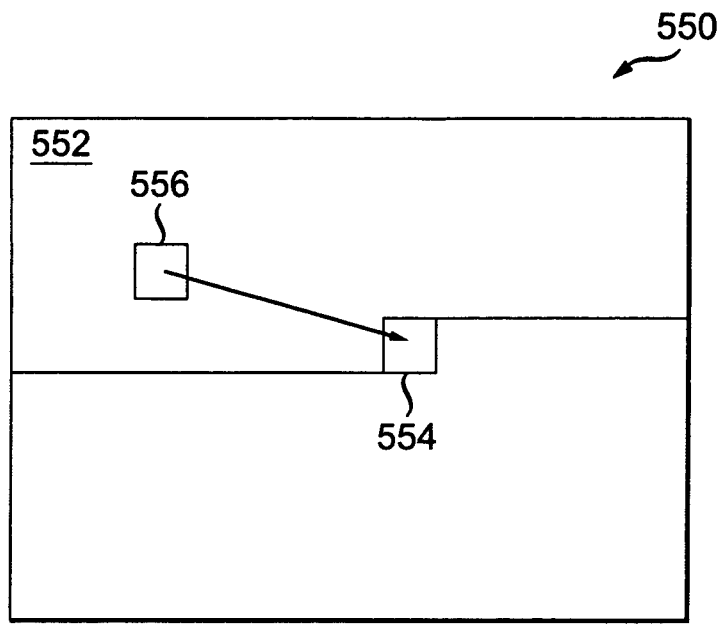
FIG. 5A is a diagram showing an example of displaced intra prediction.
Figure 5B:
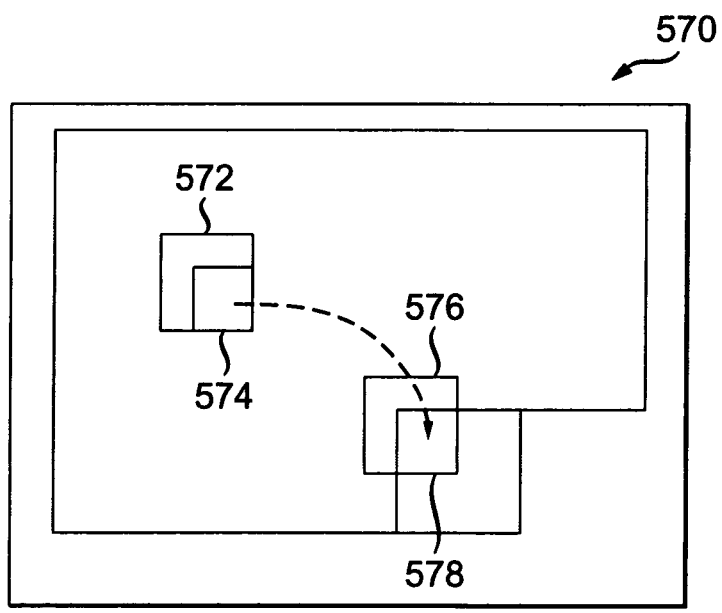
FIG. 5B is a diagram showing an example of template matching intra prediction.

The present principles are directed to methods and apparatus for DC intra prediction mode for video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Moreover, as used herein, the phrase "regular MPEG-4 AVC Standard modes" refers to the intra coding modes available in the MPEG-4 AVC Standard excluding the DC mode from the MPEG-4 AVC Standard.

Further, as used herein, the phrase "original sample data" refers to the data from the input pictures.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Figure 6:
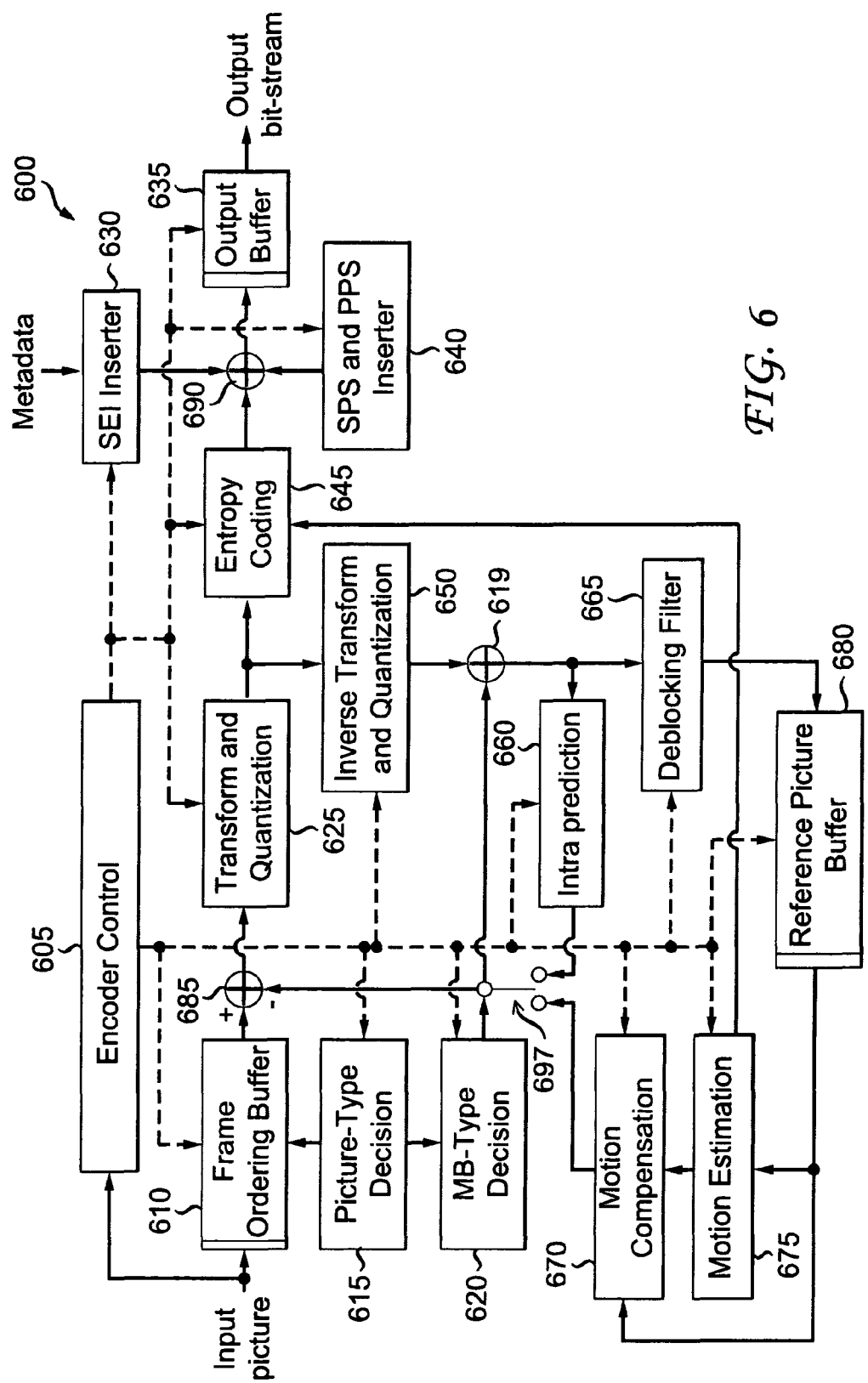
FIG. 6 is a block diagram showing an exemplary video encoder to which the present principles may be applied, in accordance with an embodiment of the present principles.

Turning to FIG. 6, an exemplary video encoder to which the present principles may be applied is indicated generally by the reference numeral 600. The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

An output of the SEI inserter 630 is connected in signal communication with a second non-inverting input of the combiner 690.

A first output of the picture-type decision module 615 is connected in signal communication with a third input of the frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of a reference picture buffer 680. An output of the reference picture buffer 680 is connected in signal communication with a second input of the motion estimator 675 and a third input of the motion compensator 670. A first output of the motion estimator 675 is connected in signal communication with a second input of the motion compensator 670. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697. An output of the macroblock-type decision module 620 is connected in signal communication with a third input of the switch 697. The third input of the switch 697 determines whether or not the "data" input of the switch (as compared to the control input, i.e., the third input) is to be provided by the motion compensator 670 or the intra prediction module 660. The output of the switch 697 is connected in signal communication with a second non-inverting input of the combiner 619 and an inverting input of the combiner 685.

A first input of the frame ordering buffer 610 and an input of the encoder controller 605 are available as inputs of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 600, for outputting a bitstream.

Figure 7:
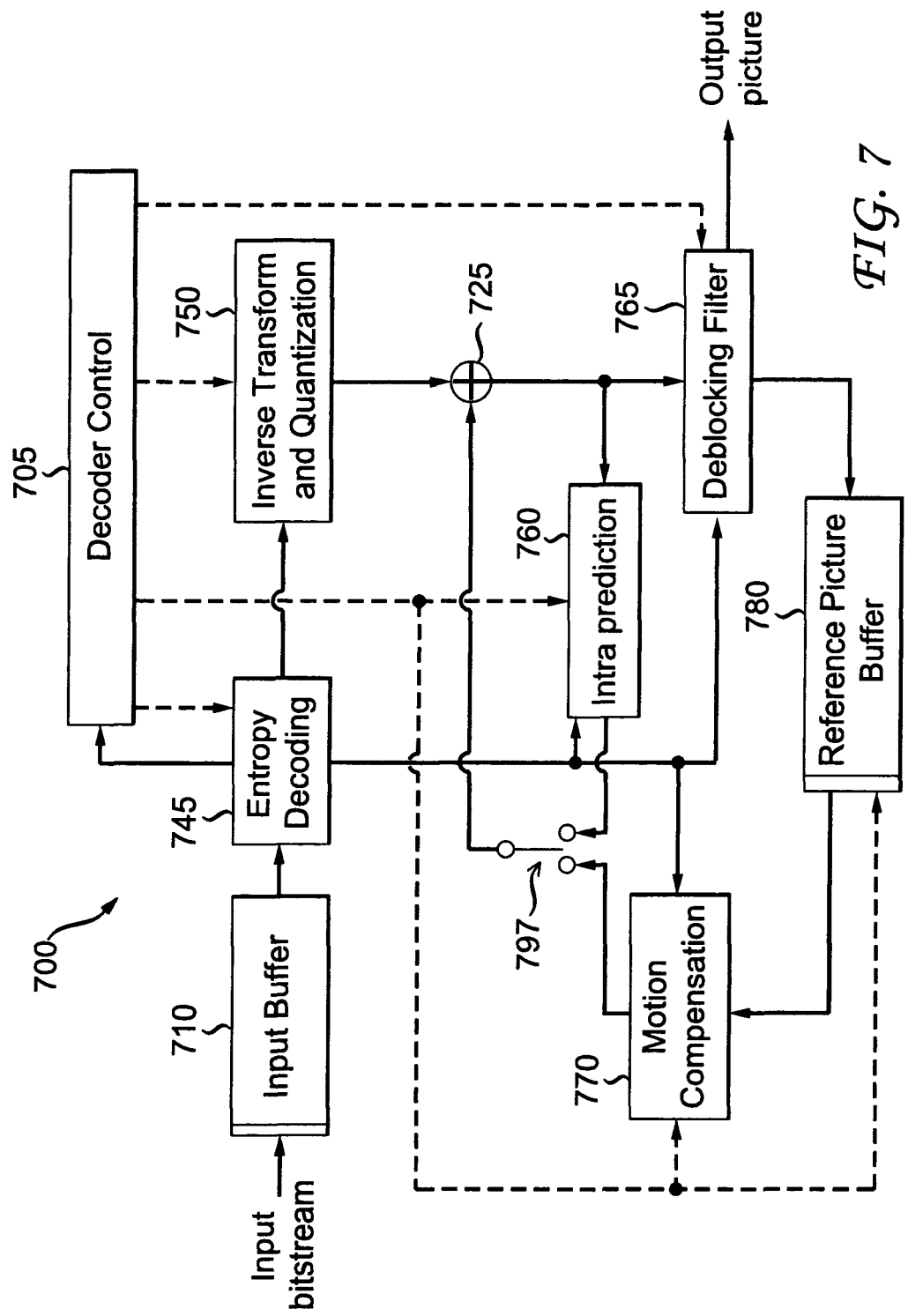
FIG. 7 is a block diagram showing an exemplary video decoder to which the present principles may be applied, in accordance with an embodiment of the present principles.

Turning to FIG. 7, an exemplary video decoder to which the present principles may be applied is indicated generally by the reference numeral 700. The video decoder 700 includes an input buffer 710 having an output connected in signal communication with a first input of an entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a first input of a reference picture buffer 780. An output of the reference picture buffer 780 is connected in signal communication with a second input of a motion compensator 770.

A second output of the entropy decoder 745 is connected in signal communication with a third input of the motion compensator 770, a first input of the deblocking filter 765, and a third input of the intra predictor 760. A third output of the entropy decoder 745 is connected in signal communication with an input of a decoder controller 705. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765. A fourth output of the decoder controller 705 is connected in signal communication with a second input of the intra prediction module 760, a first input of the motion compensator 770, and a second input of the reference picture buffer 780.

An output of the motion compensator 770 is connected in signal communication with a first input of a switch 797. An output of the intra prediction module 760 is connected in signal communication with a second input of the switch 797.

An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

As noted above, the present principles are directed to methods and apparatus for DC intra prediction mode for video encoding and decoding. In accordance with the present principles, we disclose a new DC prediction mode for intra prediction. In accordance with the present principles, the DC mode can be predicted from a pre-determined constant instead of from causal neighboring blocks. An aspect of this improvement is that it beneficially results in improved coding efficiency when there are large areas with similar colors in the content.

As noted above, we describe the present principles with respect to the MPEG-4 AVC Standard for the purpose of illustration while further noting that the present principles are not limited solely to this standard. Hence, regarding the MPEG-4 AVC Standard, as shown in FIG. 2, in the DC intra prediction mode of the MPEG-4 AVC Standard, all samples in the prediction block are predicted by the mean of samples A, B, C, D, I, J, K, and L.

A New DC Mode—Embodiment 1

In accordance with the present principles, a new DC intra prediction mode has been developed. In this new mode, the DC prediction for the block is obtained from a pre-determined constant instead of from an estimate using neighboring reconstructed samples as per the prior art.

In this embodiment, a new DC mode is proposed in addition to the MPEG-4 AVC Standard modes. The new DC mode is indicated (e.g., to a decoder) through the mode index. In an embodiment, this can be done through additional bits in overhead.

Figure 8:
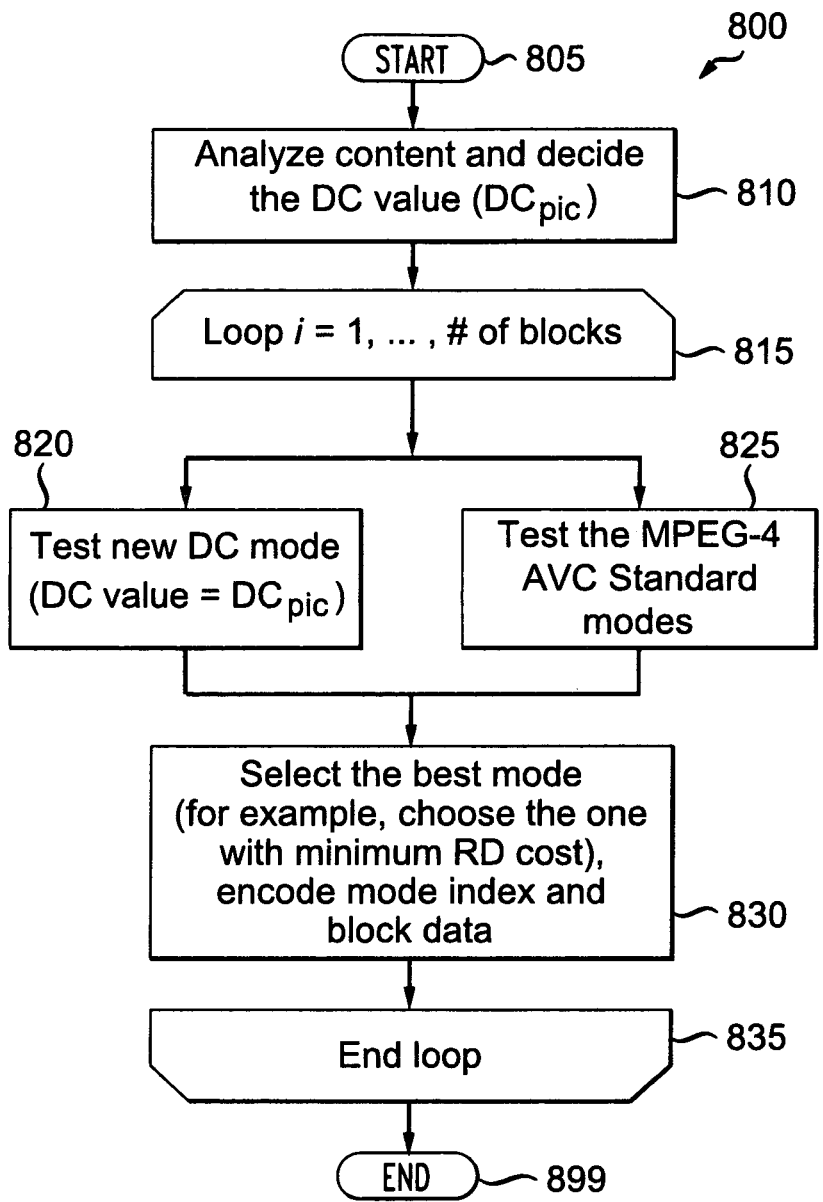
FIG. 8 is a flow diagram showing an exemplary method for utilizing a new DC mode in a video encoder, in accordance with an embodiment of the present principles.

Turning to FIG. 8, an exemplary method for utilizing a new DC mode in a video encoder is indicated generally by the reference numeral 800. The method 800 includes a start block 805 that passes control to a function block 810. The function block 810 analyzes content, decides the DC value ($DC_{pic}$) of the content based on the analysis, and passes control to a loop limit block 815. The loop limit block 815 begins a loop using a variable i having a range from 1, . . . , number (#) of blocks in, for example, a current picture corresponding to the content, and passes control to a function block 820 and a function block 825. The function block 820 tests the new DC mode (DC value=$DC_{pic}$), and passes control to a function block 830. The function block 825 tests the MPEG-4 AVC Standard modes, and passes control to the function block 830. The function block 830 selects the best mode (e.g., in one embodiment, the mode with the minimum rate distortion (RD) cost is selected), encodes the mode index and block data, and passes control to a loop limit block 835. The loop limit block 835 ends the loop, and passes control to an end block 899.

Figure 9:
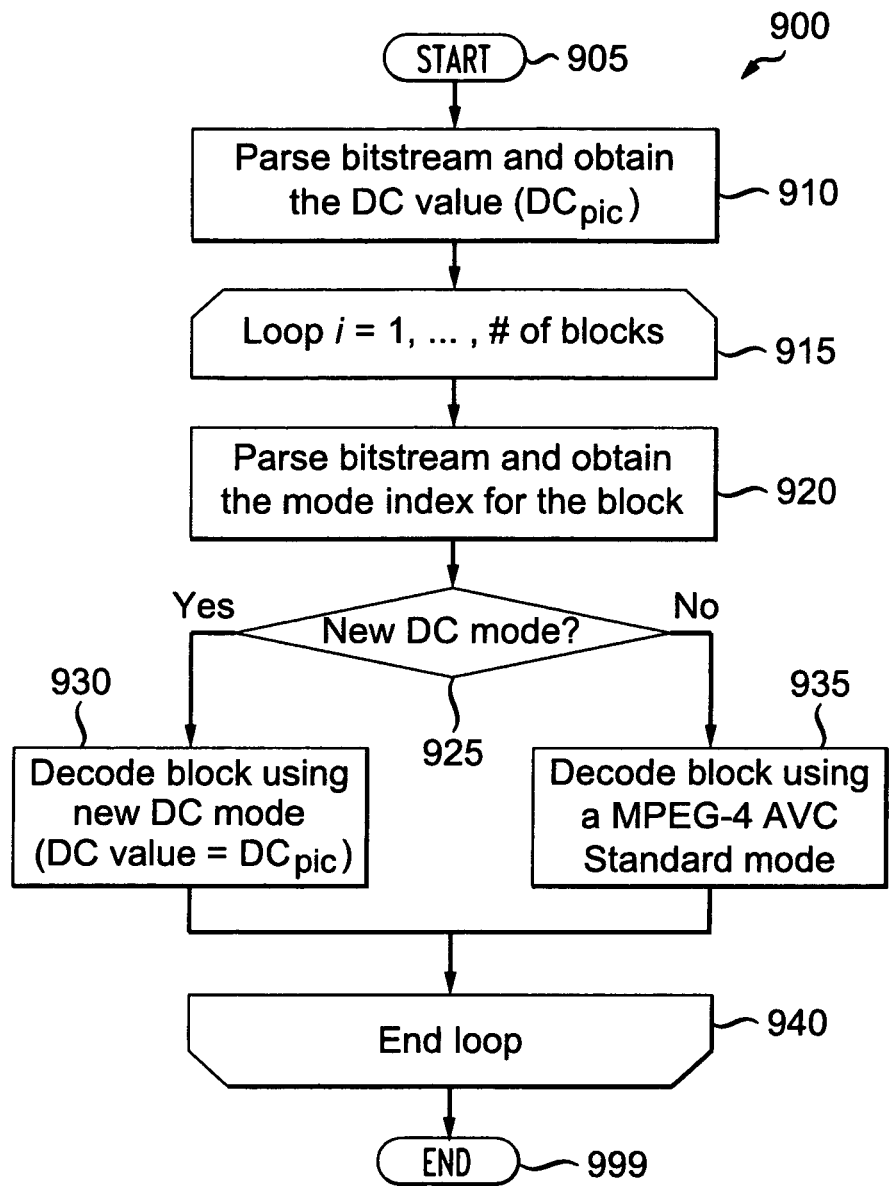
FIG. 9 is a flow diagram showing an exemplary method for utilizing a new DC mode in a video decoder, in accordance with an embodiment of the present principles.

Turning to FIG. 9, an exemplary method for utilizing a new DC mode in a video decoder is indicated generally by the reference numeral 900. The method 900 includes a start block 905 that passes control to a function block 910. The function block 910 parses a bitstream, obtains the DC value ($DC_{pic}$) there from, and passes control to a loop limit block 915. The loop limit block 915 begins a loop using a variable i having a range from 1, . . . , number (#) of blocks in, for example, a current picture, and passes control to a function block 920. The function block 920 parses the bitstream, obtains the mode index for a current block there from, and passes control to a decision block 925. The decision block 925 determines whether or not the current mode is the new DC mode. If so, then control is passed to a function block 930. Otherwise, control is passed to a function block 935. The function block 930 decodes the current block using the new DC mode (DC value=$DC_{pic}$), and passes control to a loop limit block 940. The function block 935 decodes the current block using a MPEG-4 AVC Standard mode, and passes control to the loop limit block 940. The loop limit block 940 ends the loop, and passes control to an end block 999.

Modified Encoding and Decoding of DC Mode—Embodiment 2

In this embodiment, we propose a variation without adding a new mode. Rather, we change how the DC mode is encoded and decoded. This embodiment involves a little extra computation over Embodiment 1 while saving the overhead (implicated by Embodiment 1) from adding an extra mode.

Figure 10:
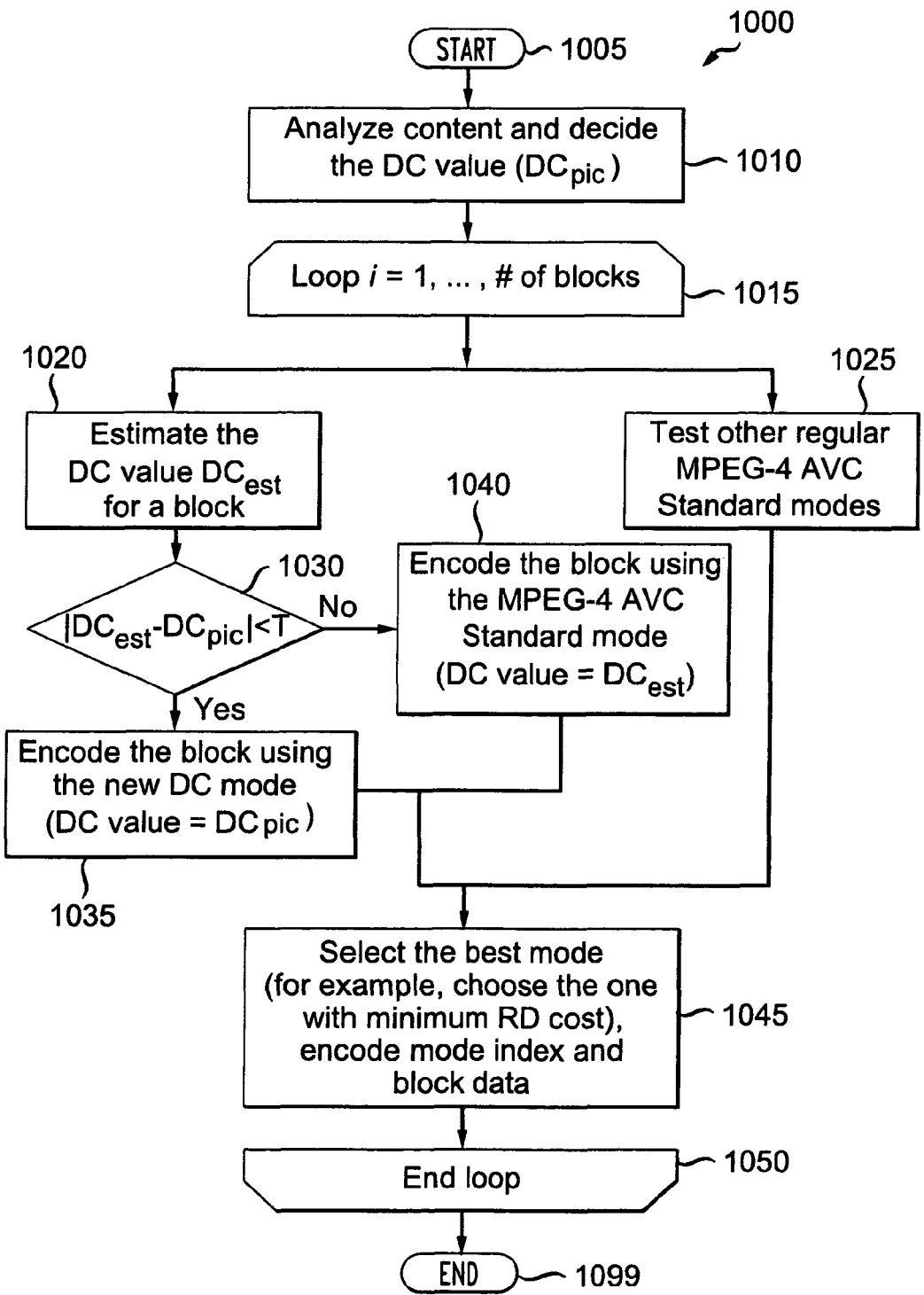
FIG. 10 is a flow diagram showing an exemplary method for encoding DC mode in a video encoder, in accordance with an embodiment of the present principles.

Turning to FIG. 10, an exemplary method for encoding DC mode in a video encoder is indicated generally by the reference numeral 1000. It is to be appreciated that the encoding of the DC mode by method 1000 differs from how DC mode is typically encoded in the prior art. The method 1000 includes a start block 1005 that passes control to a function block 1010. The function block 1010 analyzes content, decodes the DC value ($DC_{pic}$) of the content based on the analysis, and passes control to a loop limit block 1015. The loop limit block 1015 begins a loop using a variable i having a range from 1, . . . , number (#) of blocks in, for example, a current picture, and passes control to a function block 1020 and a function block 1025. The function block 1020 estimates the DC value $DC_{est}$ for a block (e.g., as done in the MPEG-4 AVC Standard), and passes control to a decision block 1030. The decision block 1030 determines whether $|DC_{est}-DC_{pic}|<T$. If so, then control is passed to a function block 1035. Otherwise, control is passed to a function block 1040. The function block 1035 encodes the current block using the new DC mode (DC value=$DC_{pic}$), and passes control to a function block 1045. The function block 1045 selects the best mode, encodes the mode index and block data, and passes control to a loop limit block 1050. The loop limit block 1050 ends the loop, and passes control to an end block 1099. The function block 1025 tests other regular (non-DC) MPEG-4 AVC Standard modes, and passes control to the function block 1045. The function block 1040 encodes the current block using a regular (non-DC) MPEG-4 AVC Standard mode (DC value=$DC_{est}$), and passes control to the function block 1045.

Figure 11:
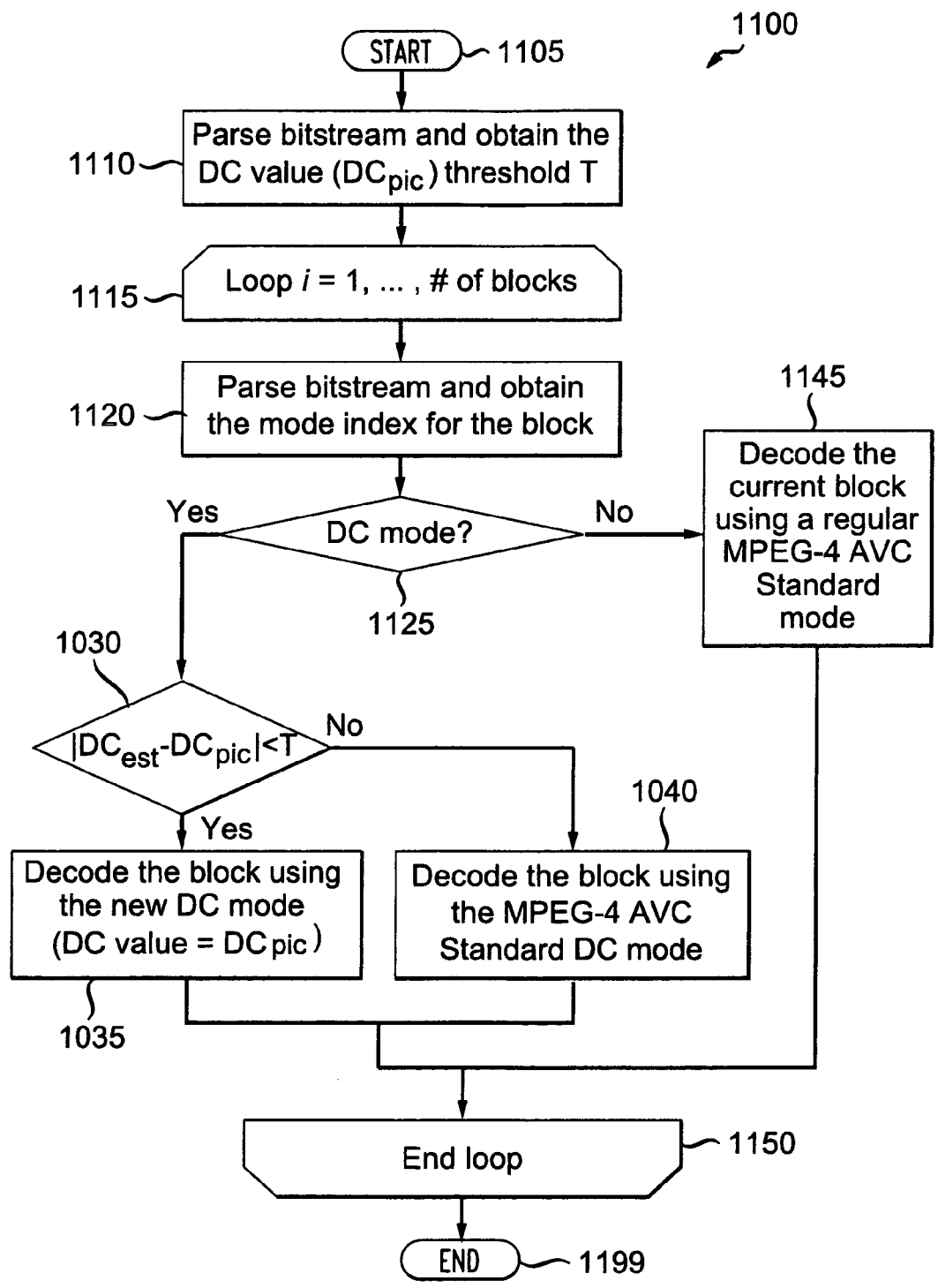
FIG. 11 is a flow diagram showing an exemplary method for decoding DC mode in a video decoder, in accordance with an embodiment of the present principles.

Turning to FIG. 11, an exemplary method for decoding DC mode in a video decoder is indicated generally by the reference numeral 1100. It is to be appreciated that the decoding of the DC mode by method 1100 differs from how DC mode is typically decoded in the prior art. The method 1100 includes a start block 1105 that passes control to a function block 1110. The function block 1110 parses a bitstream, obtains a DC value ($DC_{pic}$) and a threshold T, and passes control to a loop limit block 1115. The loop limit block 1115 begins a loop using a variable i having a range from 1, . . . , number (#) of blocks in, for example, a current picture, and passes control to a function block 1120. The function block 1120 parses the bitstream, obtains the mode index for a current block there from, and passes control to a decision block 1125. The decision block 1125 determines whether or not the current mode is DC mode. If so, then control is passed to a decision block 1130. Otherwise, control is passed to a function block 1145. The decision block 1130 determines whether or not $|DC_{est}-DC_{pic}|<T$. If so, then control is passed to a function block 1135. Otherwise, control is passed to a function block 1140. The function block 1135 decodes the current block using the new DC mode (DC value=$DC_{pic}$), and passes control to a loop limit block 1150. The function block 1140 decodes the current block using the MPEG-4 AVC Standard DC mode, and passes control to the loop limit block 1150. The function block 1145 decodes the current block using a regular (non-DC) MPEG-4 AVC Standard modes, and passes control to the loop limit block 1150. The loop limit block 1150 ends the loop, and passes control to an end block 1199.

Modified Encoding and Decoding of DC Mode—Embodiment 3

In this embodiment, we propose another variation without increasing the number of the modes. Rather, we replace the MPEG-4 AVC Standard DC mode with the proposed new DC mode. Hence it involves no extra overhead. It is important that we only apply this embodiment to the area that benefits from the new DC mode.

Figure 12:
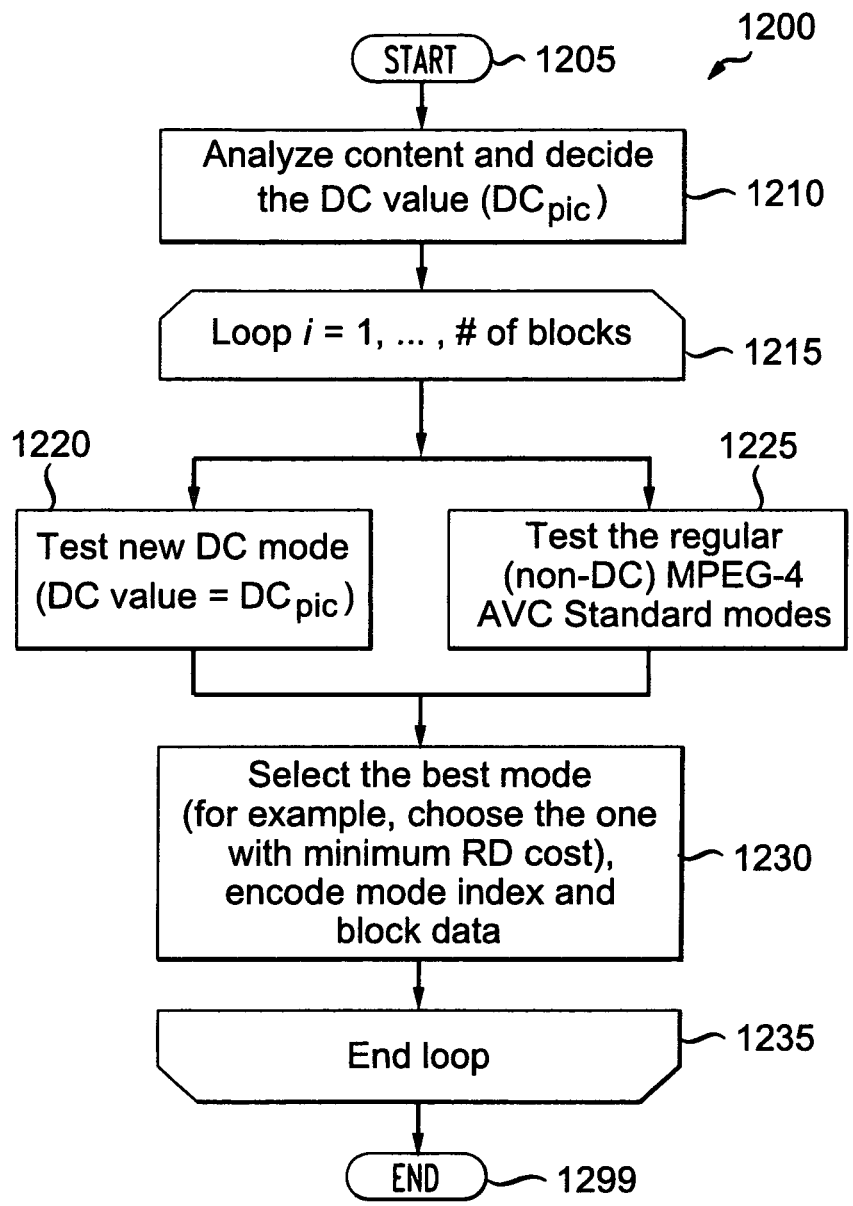
FIG. 12 is a flow diagram showing another exemplary method for utilizing a new DC mode in a video encoder, in accordance with an embodiment of the present principles.

Turning to FIG. 12, another exemplary method for utilizing a new DC mode in a video encoder is indicated generally by the reference numeral 1200. The method 1200 includes a start block 1205 that passes control to a function block 1210. The function block 1210 analyzes content, decides the DC value ($DC_{pic}$) of the content based on the analysis, and passes control to a loop limit block 1215. The loop limit block 1215 begins a loop using a variable i having a range from 1, . . . , number (#) of blocks in, for example, a current picture corresponding to the content, and passes control to a function block 1220 and a function block 1225. The function block 1220 tests the new DC mode (DC value=$DC_{pic}$), and passes control to a function block 1230. The function block 1225 tests the regular (i.e., non-DC) MPEG-4 AVC Standard modes, and passes control to the function block 1230. The function block 1230 selects the best mode (e.g., in one embodiment, the mode with the minimum rate distortion (RD) cost is selected), encodes the mode index and block data, and passes control to a loop limit block 1235. The loop limit block 1235 ends the loop, and passes control to an end block 1299.

Figure 13:
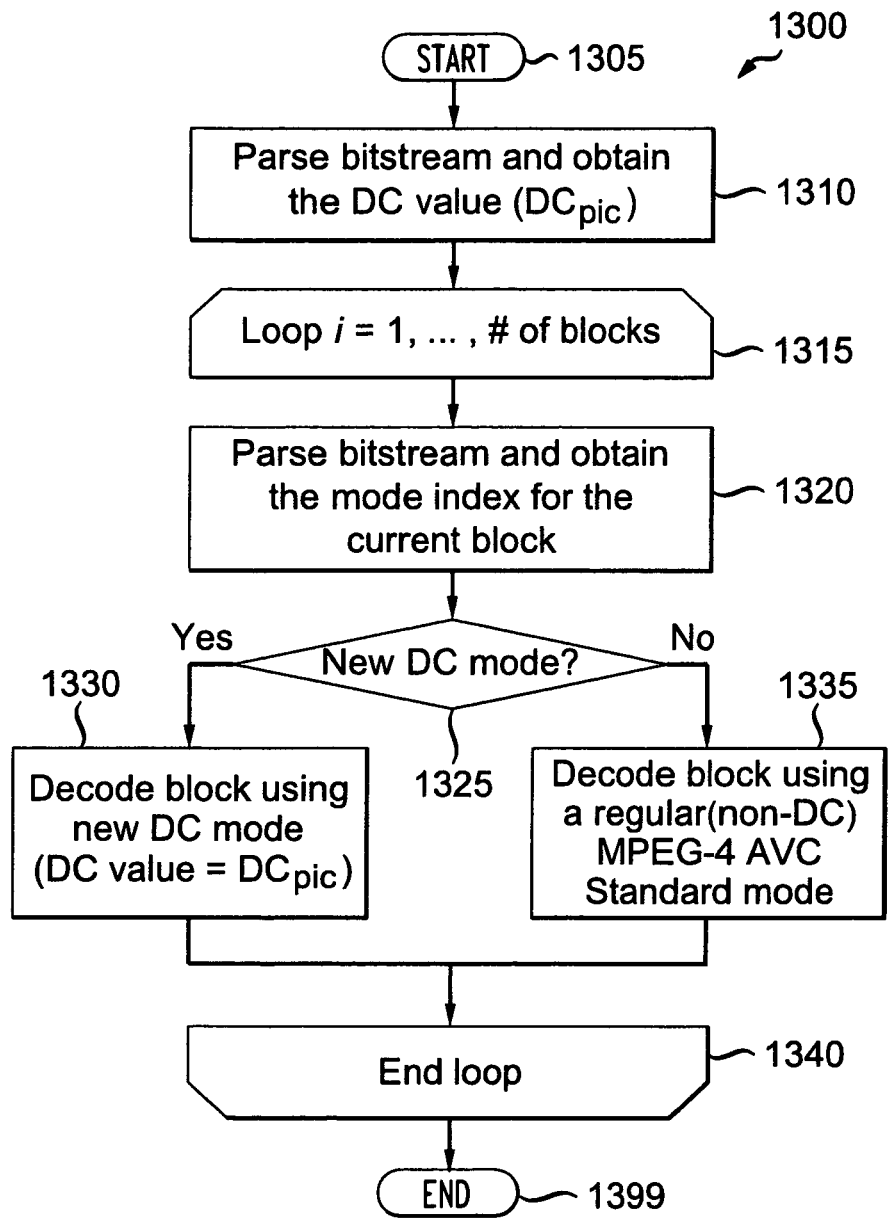
FIG. 13 is a flow diagram showing another exemplary method for utilizing a new DC mode in a video decoder, in accordance with an embodiment of the present principles.

Turning to FIG. 13, another exemplary method for utilizing a new DC mode in a video decoder is indicated generally by the reference numeral 1300. The method 1300 includes a start block 1305 that passes control to a function block 1310. The function block 1310 parses a bitstream, obtains the DC value ($DC_{pic}$) there from, and passes control to a loop limit block 1315. The loop limit block 1315 begins a loop using a variable i having a range from 1, . . . , number (#) of blocks in, for example, a current picture, and passes control to a function block 1320. The function block 1320 parses the bitstream, obtains the mode index for a current block there from, and passes control to a decision block 1325. The decision block 1325 determines whether or not the current mode is the new DC mode. If so, then control is passed to a function block 1330. Otherwise, control is passed to a function block 1335. The function block 1330 decodes the current block using the new DC mode (DC value=$DC_{pic}$), and passes control to a loop limit block 1340. The function block 1335 decodes the current block using a regular (i.e., non-DC) MPEG-4 AVC Standard mode, and passes control to the loop limit block 1340. The loop limit block 1340 ends the loop, and passes control to an end block 1399.

$DC_{pic}$ Derivation

Hereinafter, we describe various methods to derive the $DC_{pic}$. The new DC mode is most useful when one or more large areas in a picture have very smooth contents. Such a large area may involve, for example, a collective block size of 176×144 or a similar sized non-block-shaped region for a picture having a size of 352×288. Of course, such large size is relative to the overall picture size. The preceding specifications of large area size and corresponding picture size are merely for illustrative purposes and, thus, other sizes may also be used in accordance with the present principles.

When the sample values in these large smooth areas can be well represented by the $DC_{pic}$ value, we can have accurate DC prediction, even when the quantization parameter is large and the neighboring samples are severely distorted. Hence, it is important to detect if there are large smooth areas. If there are such areas, then we will determine the best $DC_{pic}$ value to represent such areas. One method is to calculate the histogram of the sample values of the input picture, where the value at the histogram peak is used as $DC_{pic}$. When the picture is noisy, we can filter the picture first before calculating the histogram.

Figure 14:
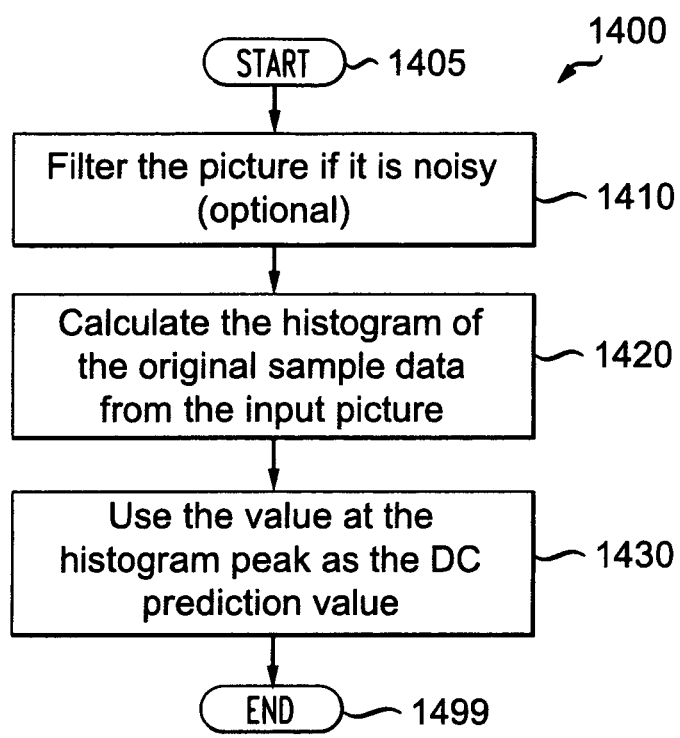
FIG. 14 is a flow diagram showing an exemplary method for deriving a DC prediction value in a video encoder, in accordance with an embodiment of the present principles.

Turning to FIG. 14, an exemplary method for deriving a DC prediction value in a video encoder is indicated generally by the reference numeral 1400. The method 1400 includes a start block 1405 that passes control to a function block 1410. The function block 1410 optionally filters the picture if it is noisy, and passes control to a function block 1420. The function block 1420 calculates the histogram of the original sample data from the input picture, and passes control to a function block 1430. The function block 1430 uses the value at the peak of the histogram as the DC prediction value, and passes control to an end block 1499.

Threshold T Consideration

The choice of the threshold T affects how often the new DC mode is selected. Threshold T should be adaptively selected based on the coding parameters and/or the video sequences.

When the quantization is coarse, the reconstruction blocks are more distorted and have lower quality. Selecting the new DC mode may be more efficient than the regular DC mode. Hence the threshold should be larger for the coarser quantization.

To save overhead, the threshold can also be stored in a look-up table at both the encoder and decoder instead of being sent in the bitstream.

Figure 15:
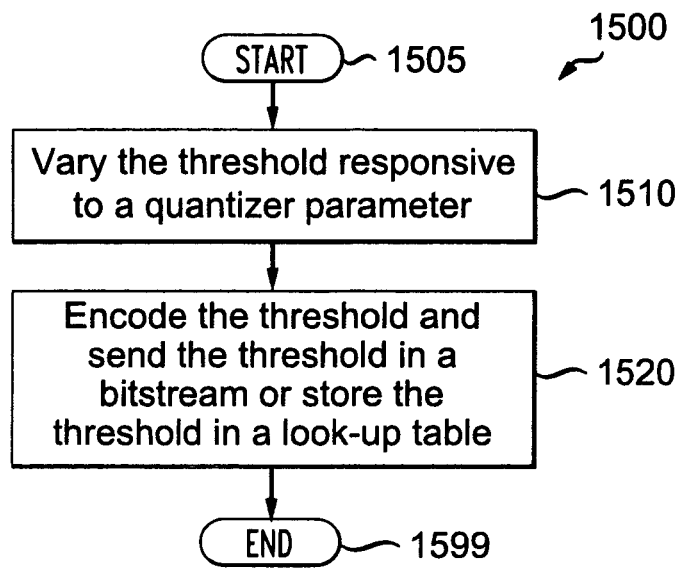
FIG. 15 is a flow diagram showing an exemplary method for encoding or storing a threshold for use in DC intra prediction mode in a video decoder, in accordance with an embodiment of the present principles.

Turning to FIG. 15, an exemplary method for encoding or storing a threshold for use in DC intra prediction mode in a video encoder is indicated generally by the reference numeral 1500. The method 1500 includes a start block 1505 that passes control to a function block 1510. The function block 1510 varies the threshold responsive to a quantizer parameter, and passes control to a function block 1520. The function block 1520 encodes the threshold and sends the threshold in a bitstream or stores the threshold in a look-up table, and passes control to an end block 1599.

Figure 16:
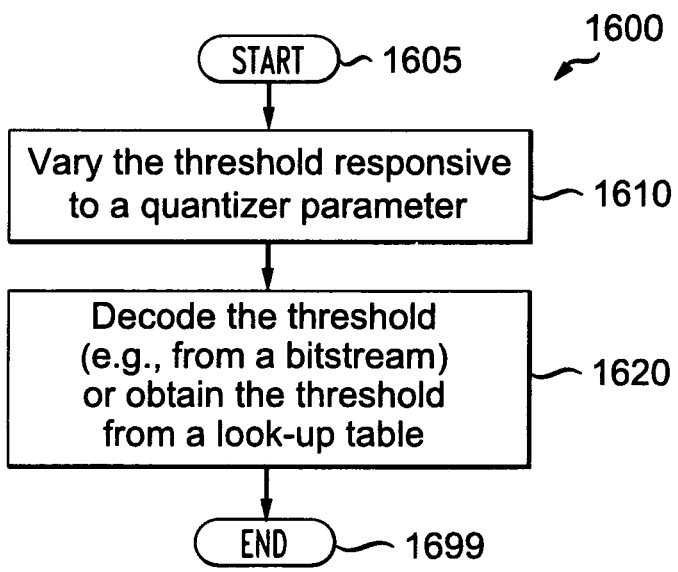
FIG. 16 is a flow diagram showing an exemplary method for decoding or obtaining from storage a threshold for use in DC intra prediction mode in a video decoder, in accordance with an embodiment of the present principles.

Turning to FIG. 16, an exemplary method for decoding or obtaining from storage a threshold for use in DC intra prediction mode in a video decoder is indicated generally by the reference numeral 1600. The method 1600 includes a start block 1605 that passes control to a function block 1610. The function block 1610 varies the threshold responsive to a quantizer parameter, and passes control to a function block 1620. The function block 1620 decodes the threshold (e.g., from a bitstream) or obtains the threshold from a look-up table, and passes control to an end block 1699.

Syntax

To synchronize the encoder and decoder, the $DC_{pic}$ value and/or the threshold T are to be known at the decoder. TABLE 1 shows exemplary picture parameter set (PPS) syntax for use with Embodiment 2, in accordance with an embodiment of the present principles. However, it is to be appreciated that such syntax can also be specified at the slice level.

TABLE 1

| pic_parameter_set_rbsp( ) { | C | Descriptor |
|---|---|---|
| .... | | |
| DC_picture | 0 | u(v) |
| T_DC | 0 | u(v) |
| ... | | |
| } | | |

The semantics of the syntax elements shown in TABLE 1 are as follows:

DC_picture specifies the $DC_{pic}$ value.

T_DC specifies the threshold value. When $|DC_{pic} - DC_{est}| < T\_DC$, $DC_{pic}$ is used as the DC prediction value. Otherwise, $DC_{est}$ is used.

A description will now be given of some of the many attendant advantages/features of the present invention, some of which have been mentioned above. For example, one advantage/feature is an apparatus having a video encoder for encoding image data for at least a portion of an input picture by deriving a direct current prediction value from a predetermined constant and using the derived direct current prediction value for a direct current intra prediction mode. The portion is encoded using the direct current intra prediction mode.

Another advantage/feature is the apparatus having the video encoder as described above, wherein the direct current prediction value is based on original sample data corresponding to the input picture.

Yet another advantage/feature is the apparatus having the video encoder as described above, wherein the derived direct current prediction value is used responsive to a comparison of improvement over another direct current prediction value relating to a different direct current mode, the different direct current mode corresponding to an existing video compression standard or recommendation.

Still another advantage/feature is the apparatus having the video encoder wherein the derived direct current prediction value is used responsive to a comparison of improvement over another direct current prediction value relating to a different direct current mode, the different direct current mode corresponding to an existing video compression standard or recommendation as described above, wherein the comparison is based on a threshold value of improvement.

Moreover, another advantage/feature is the apparatus having the video encoder wherein the comparison is based on a threshold value of improvement as described above, wherein the threshold value of improvement varies responsive to a quantization parameter.

Further, another advantage/feature is the apparatus having the video encoder wherein the comparison is based on a threshold value of improvement as described above, wherein the threshold value of improvement is stored in a look-up table.

Also, another advantage/feature is the apparatus having the video encoder wherein the derived direct current prediction value is used responsive to a comparison of improvement over another direct current prediction value relating to a different direct current mode, the different direct current mode corresponding to an existing video compression standard or recommendation as described above, wherein the comparison is based on a rate distortion cost.

Additionally, another advantage/feature is the apparatus having the video encoder as described above, wherein the direct current Prediction value is derived by analyzing the input picture to derive the direct current prediction value there from.

Moreover, another advantage/feature is the apparatus having the video encoder wherein the direct current Prediction value is derived by analyzing the input picture to derive the direct current prediction value there from as described above, wherein the direct current prediction value is derived by calculating a histogram of original sample data corresponding to the input picture, and using a value at a peak of the histogram as the direct current prediction value.

Further, another advantage/feature is the apparatus having the video encoder as described above, wherein the direct current prediction value is encoded for transmission to a corresponding decoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a video encoder for encoding image data for at least a portion of an input picture by deriving a direct current prediction value by calculating a histogram of filtered original sample data corresponding to the input picture, and using a value at a peak of the histogram as the direct current prediction value for a direct current intra prediction mode, the portion being encoded using the direct current intra prediction mode.

2. In a video encoder, a method, comprising:
   encoding image data for at least a portion of an input picture by deriving a direct current prediction value by calculating a histogram of filtered original sample data corresponding to the input picture, and using a value at a peak of the histogram as the direct current prediction value for a direct current intra prediction mode, the portion being encoded using the direct current intra prediction mode.

3. The method of claim 2, wherein the direct current prediction value is based on original sample data corresponding to the input picture.

4. The method of claim 2, wherein the derived direct current prediction value is used responsive to a comparison of improvement over another direct current prediction value relating to a different direct current mode, the different direct current mode corresponding to an existing video compression standard or recommendation.

5. The method of claim 4, wherein the comparison is based on a threshold value of improvement.

6. The method of claim 5, wherein the threshold value of improvement varies responsive to a quantization parameter.

7. The method of claim 5, wherein the threshold value of improvement is stored in a look-up table.

8. The method of claim 4, wherein the comparison is based on an RD cost.

9. The method of claim 2, wherein the direct current prediction value is derived by analyzing the input picture to derive the direct current prediction value there from.

10. The method of claim 2, further comprising encoding the direct current prediction value for transmission to a corresponding decoder.

11. In a video encoder, a method, comprising:
encoding image data for at least a portion of an input picture by deriving a direct current prediction value from a pre-determined constant and using the derived direct current prediction value for a direct current intra prediction mode, the portion being encoded using the direct current intra prediction mode, wherein the direct current prediction value is derived by analyzing the input picture to derive the direct current prediction value there from, wherein the direct current prediction value is derived by calculating a histogram of original sample data corresponding to the input picture, and using a value at a peak of the histogram as the direct current prediction value.

12. An apparatus, comprising:
a video decoder for decoding image data for at least a portion of a picture by parsing a bitstream to obtain a direct current prediction value there from, obtained by calculating a histogram of filtered original sample data corresponding to the input picture, and using a value at a peak of the histogram as the direct current prediction value, and using the parsed direct current prediction value for a direct current intra prediction mode, the portion being decoded using the direct current intra prediction mode.

13. In a video decoder, a method, comprising:
decoding image data for at least a portion of a picture by parsing a bitstream to obtain a direct current prediction value there from, obtained by calculating a histogram of filtered original sample data corresponding to the input picture, and using a value at a peak of the histogram as the direct current prediction value, and using the parsed direct current prediction value for a direct current intra prediction mode, the portion being decoded using the direct current intra prediction mode.

14. The method of claim 13, wherein the derived direct current prediction value is used responsive to a comparison of improvement over another direct current prediction value relating to a different direct current mode, the different direct current mode corresponding to an existing video compression standard or recommendation.

15. The method of claim 14, wherein the comparison is based on a threshold value of improvement.

16. The method of claim 15, wherein the threshold value of improvement varies responsive to a quantization parameter.

17. The method of claim 15, wherein the threshold value of improvement is stored in a look-up table.

18. A non-transitory computer readable storage media having video signal data encoded thereupon, comprising:
image data encoded for at least a portion of an input picture by analyzing the input picture to derive a direct current prediction value there from, obtained by calculating a histogram of filtered original sample data corresponding to the input picture, and using a value at a peak of the histogram as the direct current prediction value, and using the derived direct current prediction value for a direct current intra prediction mode, the portion being encoded using the direct current intra prediction mode.

* * * * *